May 4, 1954  F. A. ANDERSON  2,677,573
VEHICLE DOOR CLOSING DEVICE
Filed May 4, 1953  2 Sheets-Sheet 1

INVENTOR
FRANK A. ANDERSON
BY *Hilmond O. Vogel*
ATTORNEY

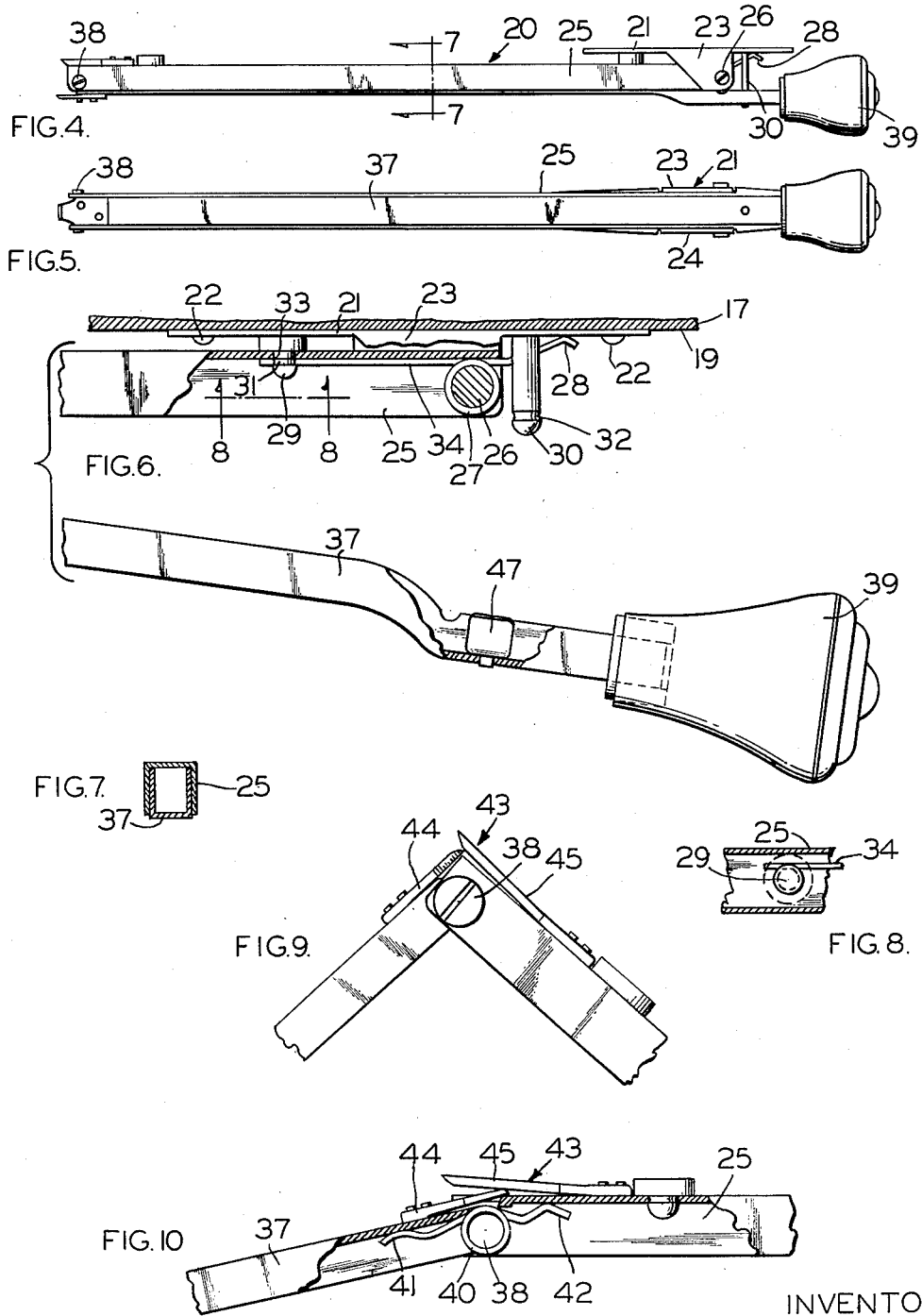

Patented May 4, 1954

2,677,573

UNITED STATES PATENT OFFICE 2,677,573

VEHICLE DOOR CLOSING DEVICE

Frank A. Anderson, Chicago, Ill.

Application May 4, 1953, Serial No. 352,710

10 Claims. (Cl. 296—44)

This invention relates to an improved vehicle door closing device and is an improvement over the construction shown in my Patent 2,610,084 patented September 9, 1952. More particularly it relates to a door closing handle device particularly adapted for closing the door of the vehicle disposed on the side opposite to the operator's station.

As indicated in the above mentioned patent, modern design automobiles are such that it is extremely difficult for the operator to enter the car from the right hand side, and after he has seated himself, to close the door. The width of the front seat and the open position of the door requires the operator to slide over to the open door and generally exert unusual effort in order to close the same. In the case of salesmen, doctors, etc., who must do this many times daily it becomes a real effort and the great temptation is to enter from the left hand side of the car, a practice which is of course extremely dangerous. It is applicant's prime object therefore to provide an improved vehicle door closing device which can be extended within easy reach of an operator sitting in the operator's station to effect closing of the open door located on the right hand side of an automobile.

It is a more specific object to provide an improved door closing device for a vehicle including a pair of pivoted arms connected to the right hand vehicle door, the arms normally being in a collapsed position, parallel and against the door and being swingable to a laterally extended position whereby the door may be closed from the operator's position.

A still further object is to provide an improved door closing device comprising a pair of hinged channel shaped arms adapted to be resiliently held in a nested or telescoping position against the door in parallel relation during the non-use position, the arms being swingable to an extended position in lateral relation with respect to the vehicle door whereby the door may be readily swung to a closed position by an operator seated in the operator's position.

A more specific object of the invention is an improved vehicle door closing device comprising a bracket adapted to be connected to the inner side of a door, the device including a pair of hinged channel arms with spring tension means urging said arms into a normal nested position parallel with the door, the bracket including releasable locking means for locking the arms in the nested out-of-the-way position securely held against the side of the door.

These and further objects will become more readily apparent from a reading of the specification when examined in connection with the accompanying sheets of drawings.

In the drawings:

Figure 4 is a plan view of an improved door closing device;

Figure 5 is a side elevational view of a door closing device;

Figure 6 is an enlarged plan view of portions of a door closing device with certain parts broken away to illustrate the invention.

Figures 7 is an enlarged sectional view along the line 7—7 taken on Figure 4;

Figure 8 is a sectional view taken along the line 8—8 of Figure 6;

Figure 9 is a detail plan view of a portion of a door closing device showing an operating position of the same; and Figure 10 is a plan view of a portion of a door closing device showing an operating position with certain parts broken away.

Figure 1:
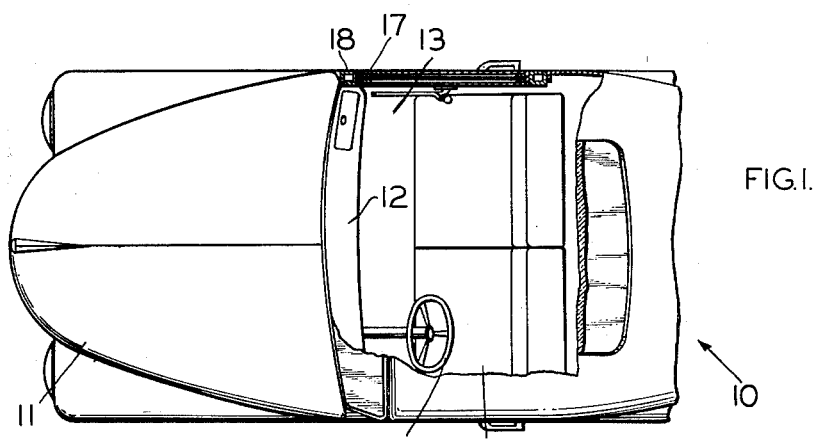
Figure 1 is a plan view of an automobile with portions of the top broken away to show a vehicle door closing device in a normal or non-use position against the closed right hand door.
Figure 2:
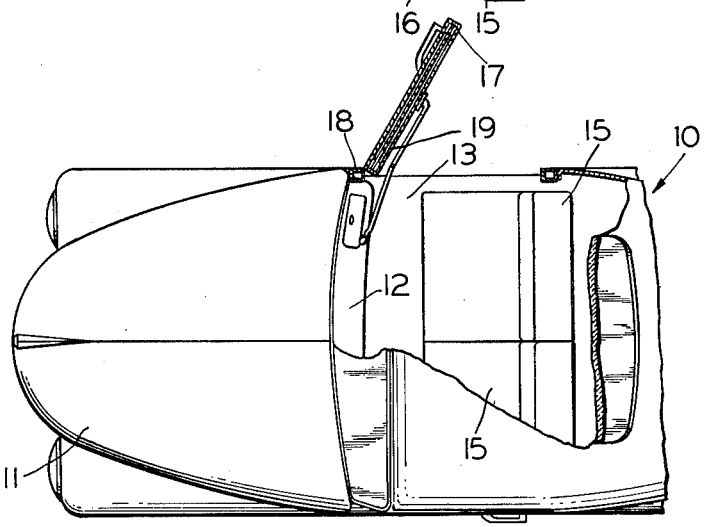
Figure 2 is a plan view similar to Figure 1, showing the right hand door in an open position with one of the arms of a door closing device swung into an extended position with a hand grip disposed within the car.
Figure 3:
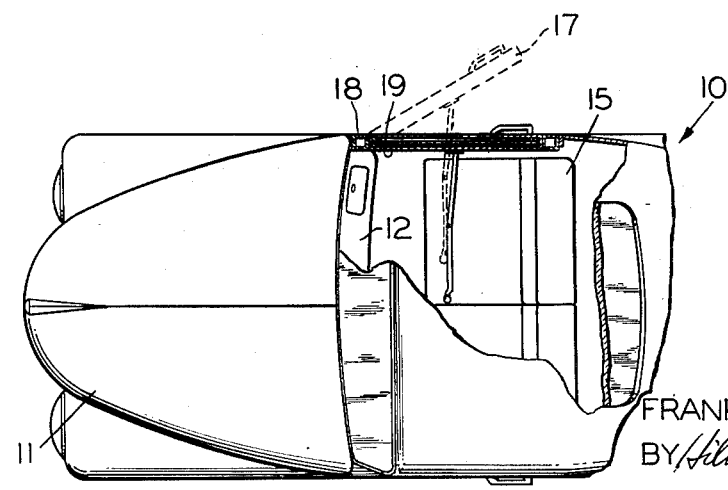
Figure 3 is a plan view similar to Figure 2 showing several positions of a door closing device.

Referring now to Figures 1 through 3 a conventional vehicle such as an automobile is designated by the reference character 10. The vehicle 10 comprises a hood 11, dashboard 12 and front seat compartment 13. An operator's station is designated at 15 in proximity to a steering wheel 16. The right hand front door is designated at 17, the same being hingedly connected in conventional fashion to a front post 18. The door 17 has an inner surface or side 19.

Referring now to Figures 1 through 6, a vehicle door closing device is designated generally at 20. The device 20 comprises a bracket 21 which, as shown particularly in Figure 6, may be attached to the inner side 19 of the front right hand door 17 by means of conventional fasteners 22. The bracket 21 comprises inwardly projecting lips 23 and 24 to which one end of a first channel shaped arm 25 is hingedly connected by hinge pin 26. A spring 27 is wound about the hinge pin 26, the spring 27 having a section 28 in resilient engagement with the bracket 21. The bracket 21 further includes a first pin 29 and a second pin 30 projecting laterally thereof. The pins 29 and 30 are respectively provided with annular recesses 31 and 32. The pin 29 is adapted to project through an opening 33 provided in the arm 25. A spring section 34 of the spring 27 resiliently engages the recess 31 of the pin 29 for resiliently, though releasably, locking the arm 25 in a normal position parallel to the door 17. The spring section 28, then urges the arm 25 into the normal position, and the section 34 releasably locks the arm 25 in the normal position as indicated in Figure 8.

A second arm is designated at 37. The second arm 37 is of channel shape and has one end hingedly connected, by means of a hinge pin 38, to the arm 25. The arm 37 includes a hand grip 39. A spring 40 encircles the pin 38, the spring 40 having portions 41 and 42 urging the arms 25 and 37 laterally apart from a nested or collapsed position. A latch device is designated at 43, this device including spring plates 44 and 45 respectively connected to the arms 37 and 25 as indicated best in Figures 9 and 10. Upon opening of the arms 37 and 25, the plates 44 and 45 engage each other and are moved to an overlapping position whereupon they serve to releasably lock the arms in a straightened or extended position as indicated in Figure 10.

In the normal non-use position the arms 25 and 37 are collapsed or are in a nested position lying in parallel relation against the inner side 19 of the door 17, as indicated in Figure 1. The arm 25 is held securely in this position by the pin 29 which is engaged by the spring section 34. Thus the arm 25 is held rigidly against possible rattle and in an out of the way position. The arm 37 further includes a spring clip 47 which engages the pin 30 in releasable locking position also to assure rigid support of the arms 25 and 37.

In the normal position thus the arms 25 and 37 are securely held against the door 17 in parallel and nested position. When the door 17 is in the open position indicated in Figure 2 and the operator enters the car or automobile, he grasps the handle or hand grip 39 and moves the arm 37 from the nested position shown in Figures 4 and 5, to the position shown in Figure 2. He then seats himself in the operator's station 15 and he can easily grasp the handle 39 and pull the same to the extended straightened position shown in dotted lines in Figure 3, whereupon he closes the door.

He now releases the handle 39 and the arm 25 is swung back to the normal position by action of the spring 27. The operator simultaneously moves the arms 25 and 37 in jackknife relation from the releasably locked position shown in Figure 10 to the normal nested position shown in Figures 1, 4 and 5.

It can now be seen that by nesting the channel arms in the manner shown that the device 20 is securely held in a non-rattling normal position in an out of the way condition. Both arms are securely held by the releasable locking means or pins 29 and 30 and the latch device 43 securely holds the arms in the desired extended or straightened position. By the novel details indicated the operator has full and complete control of the device.

It can now be seen that the objects of the invention have been fully achieved and that an improved vehicle door closing device has been provided. It must be understood that changes and modifications may be made without departing from the scope of the invention as claimed.

I claim:

1. A handle device for vehicle doors comprising a bracket adapted to be attached to the inner side of a vehicle door, a first arm of channel shape having one end connected to said bracket for swinging movement about a vertical axis, a second arm of channel shape connected to the other end of said first arm for swinging movement about a vertical axis, said second arm having a hand grip connected thereto, means for normally retaining said first and second arms in nested relation and normally in substantially longitudinally extending parallel relation with respect to said door, said means including first and second laterally spaced pins connected to said bracket and projecting inwardly from said door, said first arm having an opening through which said first pin projects during the normal position of said first arm, a first spring connected to said first arm and engaging said bracket for urging said arm to said normal position, said first spring including a portion disposed inside the channel of said first arm and engaging the first pin to resiliently lock said first arm in the normal position, a second spring connected to the adjacent hinged ends of said first and second arms for normally urging said second arm to swing laterally with respect to said first arm, a catch element on said second arm telescopingly engageable with said second pin for retaining said second arm in the nested position with respect to said first arm, said arms being swingable by an operator from the normal position to a straightened extended position wherein both arms extend in a lateral direction with respect to the vehicle, and first and second latch elements respectively on said first and second arms adjacent said second spring for releasably locking said first and second arms in the extended position.

2. A handle device for vehicle doors comprising a bracket adapted to be attached to the inner side of a vehicle door, a first arm of channel shape having one end connected to said bracket for swinging movement about a vertical axis, a second arm of channel shape connected to the other end of said first arm for swinging movement about a vertical axis, said second arm having a hand grip connected thereto, means for normally retaining said first and second arms in nested relation and normally in substantially longitudinally extending parallel relation with respect to said door, said means including first and second laterally spaced pins connected to said bracket and projecting inwardly from said door, said first arm having an opening through which said first pin projects during the normal position of said first arm, a first spring connected to said first arm and engaging said bracket for urging said arm to said normal position, said first spring including a portion disposed inside the channel of said first arm and engaging the first pin to resiliently lock said first arm in the normal position, a second spring connected to the adjacent hinged ends of said first and second arms for normally urging said second arm to swing laterally with respect to said first arm, and a catch element on said second arm engageable with said second pin for retaining said second arm in the nested position with respect to said first arm, said arms being swingable by an operator from the normal position to a straightened extended position wherein both arms extend in a lateral direction with respect to the vehicle.

3. A handle device for vehicle doors comprising a bracket adapted to be attached to the inner side of a vehicle door, a first arm of channel shape having one end connected to said bracket for swinging movement about a vertical axis, a second arm of channel shape connected to the other end of said first arm for swinging movement about a vertical axis, said second arm having a hand grip connected thereto, means for normally retaining said first and second arms in nested relation and normally in substantially longitudinally extending parallel relation with respect to said door, said means including first and second laterally spaced pins connected to said bracket and projecting inwardly from said door, said first arm having an opening through which said first pin projects during the normal position of said first arm, a first spring connected to said first arm and engaging said bracket for urging said arm to said normal position, said first spring including a portion disposed inside the channel of said first arm and engaging the first pin to resiliently lock said first arm in the normal position, a second spring connected to the adjacent hinged ends of said first and second arms for normally urging said second arm to swing laterally with respect to said first arm, and a catch element on said second arm engageable with said second pin for retaining said second arm in the nested position with respect to said first arm, said arms being swingable by an operator from the normal position to a straightened extended position wherein both arms extend in a lateral direction with respect to the vehicle, and means on said first and second arms for releasably locking said first and second arms in the extended position.

4. A handle device for vehicle doors comprising a bracket adapted to be attached to the inner side of a vehicle door, a first arm having one end connected to said bracket for swinging movement about a vertical axis, a second arm connected to the other end of said first arm for swinging movement about a vertical axis, said second arm having a hand grip connected thereto, means for normally retaining said first and second arms normally in substantially longitudinally extending parallel relation with respect to each other and with respect to said door, said means including first and second laterally spaced pins connected to said bracket and projecting inwardly from said door, said first arm having an opening through which said first pin projects during the normal position of said first arm, a first spring connected to said first arm and engaging said bracket for urging said arm to said normal position, said first spring including a portion engaging the first pin to resiliently lock said first arm in the normal position, a second spring connected to the adjacent hinged ends of said first and second arms for normally urging said second arm to swing laterally with respect to said first arm, and a catch element on said second arm engageable with said second pin for retaining said second arm in the parallel position with respect to said first arm, said arms being swingable by an operator from the normal position to a straightened extended position wherein both arms extend in a lateral direction with respect to the vehicle.

5. A handle device for vehicle doors comprising a bracket adapted to be attached to the inner side of a vehicle door, a first arm having one end connected to said bracket for swinging movement about a vertical axis, a second arm connected to the other end of said first arm for swinging movement about a vertical axis, said second arm having a hand grip connected thereto, means for normally retaining said first and second arms normally in substantially longitudinally extending parallel relation with respect to each other and with respect to said door, said means including first and second laterally spaced pins connected to said bracket and projecting inwardly from said door, said first arm having an opening through which said first pin projects during the normal position of said first arm, a spring connected to said first arm and engaging said bracket for urging said arm to said normal position, said spring including a portion engaging the first pin to resiliently lock said first arm in the normal position, and a catch element on said second arm engageable with said second pin for retaining said second arm in the parallel position with respect to said first arm, said arms being swingable by an operator from the normal position to a straightened extended position wherein both arms extend in a lateral direction with respect to the vehicle.

6. A handle device for vehicle doors comprising a bracket adapted to be attached to the inner side of a vehicle door, a first arm of channel shape connected to said bracket for lateral swinging movement with respect to said door, a second arm connected to said first arm, said second arm being of channel shape and being adapted to be laterally moved from a nested position with said first arm to an extended position, hand gripping means on said second arm, and spring means between said bracket and said first arm for normally maintaining the nested arms in substantially parallel position with respect to said vehicle door, said first and second arms being movable from the normal position to the extended position wherein both arms are longitudinally in substantial alignment and extend laterally into a vehicle.

7. A handle device for vehicle doors comprising a bracket adapted to be attached to the inner side of a vehicle door, a first arm of channel shape connected to said bracket for lateral swinging movement with respect to said door, a second arm connected to said first arm, said second arm being of channel shape and being adapted to be laterally moved from a nested position with said first arm to an extended position, hand gripping means on said second arm, spring means between said bracket and said first arm for normally maintaining the nested arms in substantially parallel position with respect to said vehicle door, said first and second arms being movable from the normal position to the extended portion wherein both arms are longitudinally in substantial alignment and extend laterally into a vehicle, and means on said bracket and said first arm for releasably locking said first arm in said normal position.

8. A handle device for vehicle doors comprising a bracket adapted to be attached to the inner side of a vehicle door, a first arm of channel shape connected to said bracket for lateral swinging movement with respect to said door, a second arm connected to said first arm, said second arm being of channel shape and being adapted to be laterally moved from a nested position with said first arm to an extended position, hand gripping means on said second arm, spring means between said bracket and said first arm for normally maintaining the nested arms in substantially parallel position with respect to said vehicle door, said first and second arms being movable from the normal position to the extended portion wherein both arms are longitudinally in substantial alignment and extend laterally into a vehicle, and first and second releasable locking means on said bracket, said first means being engageable with said first arm for releasably locking said first arm in the normal position, said second releasable locking means being adapted to releasably lock said second arm in said normal position.

9. A handle device for vehicle doors comprising a bracket adapted to be attached to the inner side of a vehicle door, a first arm of channel shape connected to said bracket for lateral swinging movement with respect to said door, a second arm connected to said first arm, said second arm being of channel shape and being adapted to be laterally moved from a nested position with said first arm to an extended position, hand gripping means on said second arm, spring means between said bracket and said first arm for normally maintaining the nested arms in substantially parallel position with respect to said vehicle door, said first and second arms being movable from the normal position to the extended portion wherein both arms are longitudinally in substantial alignment and extend laterally into a vehicle, first and second releasable locking means on said bracket, said first means being engageable with said first arm for releasably locking said first arm in the normal position, said second releasable locking means being adapted to releasably lock said second arm in said normal position, and releasable latch elements connected to said first and second arms and engageable with each other for locking said arms in the extended position.

10. A handle device for vehicle doors comprising a bracket adapted to be attached to the inner side of a vehicle door, a first arm connected to said bracket for lateral swinging movement with respect to said door, a second arm hingedly connected to said first arm, said second arm normally being in a folded position in adjacent and substantially parallel relation to said first arm, said second arm being adapted to be laterally moved from the normal position with respect to said first arm to a laterally extended position, hand-gripping means on said second arm, spring means between said bracket and said first arm for normally maintaining the arms in the normal substantially parallel position with respect to the vehicle door, said first and second arms being movable from the normal position to the extended position against the action of said spring wherein both arms are longitudinally in substantial alignment and extend laterally into a vehicle, and means releasably locking said arms in the normal position.

References Cited in the file of this patent

UNITED STATES PATENTS

| Number | Name | Date |
|---|---|---|
| 1,957,710 | Hennicke | May 8, 1934 |
| 2,274,892 | Fox | Mar. 3, 1942 |
| 2,610,084 | Anderson | Sept. 9, 1952 |
| 2,620,682 | Perrot | Dec. 9, 1952 |